ANALOG-TO-DIGITAL SHAFT ENCODER

Filed April 10, 1961 2 Sheets-Sheet 1

INVENTOR.
RUDOLPH LITTE
BY
Weingarten, Orenbuch & Pandiscio
ATTORNEYS

INVENTOR.
RUDOLPH LITTE
BY

ATTORNEYS 3,209,345
Patented Sept. 28, 1965

3,209,345

ANALOG-TO-DIGITAL SHAFT ENCODER

Rudolph Litte, Lincoln, Mass., assignor to Wayne-George Corporation, Boston, Mass., a corporation of Massachusetts Filed Apr. 10, 1961, Ser. No. 101,802
1 Claim. (Cl. 340—347)

This invention relates to analog-to-digital shaft encoders and more particularly to encoders which embody an electrostatic sensing technique.

As is well known, an analog-to-digital shaft encoder is a device adapted to provide a digital information code which is characteristic of the angular position of a rotatable shaft. Essentially, a shaft encoder comprises (1) a code disk or wheel having a unique code pattern and (2) a sensing device adapted (a) to read the code wheel during relative rotation of the code wheel and sensing device and (b) to produce an electrical output which is a direct measurement of the angular position but in code form. The unique code pattern may consist of one or more concentric code tracks, the code pattern being variable according to the desired end use for the encoder. An analog-to-digital shaft encoder produces a parallel line output in digital code form. Most commonly, the digital code is in one of two forms, pure binary or reflected binary, that is, Gray code.

Initially, shaft encoders were designed with direct brush-type code wheel contacts for generating the code signals. However, this technique of code signal generation has the limitation of brush wear which is particularly severe at higher angular speeds. As a consequence, brush-type sensing finds application only at slow rotational speeds.

The limitations of brush-type sensing are overcome by using electro-optical means for code signal generation. Photoelectric sensors are able to provide resolution capabilities for a given code disk diameter many times those of the brush-type sensing techniques. At the same time, the absence of direct brush-type contacts results in excellent life and resolution characteristics independent of rotational speeds. As a result, most high accuracy encoding currently is accomplished by photoelectric encoders.

However, the electro-optical sensing technique has several disadvantages. One basic disadvantage of the optical system is the limited lifetime of the luminous source which it necessarily embodies. This is true whether the luminous source is a continuous or flash-type lamp. Both types of lamps burn out and are easily damaged by shock. Another disadvantage of the optical system is the space requirement of the luminous source. This disadvantage is two-fold: (1) the luminous source itself occupies substantial space; (2) the luminous source must be so located as to be readily accessible. A third disadvantage of the optical system is the need for collimating the light beam in order to attain the desired resolution. A further disadvantage of the optical system is the need for a gang of light-responsive, signal-generating means, i.e., photocells. These photocells must be high-performance, long-life units. A fifth disadvantage is the fragility of the expensive optical code wheels.

It has been recognized that the basic disadvantages of the contact brush and electro-optical sensing techniques can be avoided by using an electrostatic sensing technique. In the electrostatic technique, there need be no component which is subject to failure other than relatively reliable electronic components such as connectors, terminals, transistors, capacitors, and the like. Moreover, an electrostatic encoder need not be as bulky as a brush-type or optical-type encoder in view of the fact that it does not require brushes or holding means for the brushes, or luminous sources and photocells. Also important is the fact that the code wheel and its companion electrostatic sensors can be packaged by themselves in a simple, compact, hermetically sealed module which can easily be coupled to a multi-amplifier module or to other logic modules.

Accordingly, the primary object of the present invention is to provide a novel shaft encoder which embodies an electrostatic sensing technique and thereby provides material advantages over encoders heretofore known and used.

A more specific object of the present invention is to provide an electrostatic analog-to-digital shaft encoder which employs a code disk having a basic code pattern which comprises a series of adjacent conductive segments spaced by relatively small insulating areas, with successive conductive segments oppositely polarized electrically. In the physical embodiment of the present invention, all of the conductive components may be printed, whereby relatively little or no wiring, except for input and output connections, is required.

A more specific object of the present invention is to provide an electrostatic shaft encoder comprising a code disk which may be either stationary or rotatable, said disk having a code pattern comprising at least one and generally a plurality of concentric code tracks each consisting of a series of conductive segments spaced by relatively small insulating areas, with succesive segments oppositely polarized electrically, and one or more probes for each code track adapted to detect the electrostatic potentials of the segments in their respective code tracks. The potentials detected by the probe provide a digital indication of the angular position of the shaft to which the encoder may be attached.

A further specific object of the present invention is to provide an analog-to-digital shaft encoder characterised by a code disk having a code pattern comprising a series of oppositely polarized conductive segments, sensor means for sensing the electrical potential of individual code segments during relative rotation of said code disk and said sensor means, means for enhancing the level of the signal picked up by the probes, and means for compensating for non-uniform spacing between said code disk and said sensor means.

Described briefly, an encoder constructed according to the present invention comprises two basic components, a code disk and an electrostatic sensor, mounted for relative rotation. Either component may be rotatable; the other is stationary. There may be more than one code disk, and each code disk may have one or more code tracks. Each code track consists of a series of spaced conductive segments with means for coupling a first varying potential to selected segments and additional means for coupling an opposite potential to the remaining segments. There is at least one, but preferably two, electrostatic sensors for each code disk. Each electrostatic sensor will consist of one or more sensing means (probes) for each code track. Each sensing means is adapted to scan a code track during relative rotation of the code disk and the sensor and to generate a train of output signals whose polarity shifts in accordance with polarity reversals of the electrostatic potentials which it senses. Positive and negative potentials are applied to the code disk by capacitive coupling or by direct connections between the code disk and input leads. To facilitate comprehensive explanation of the invention without unduly complicating this specification, the embodiments selected for illustration comprise a single rotatable code disk and two stationary electrostatic sensor disks. The code disk bears two identical code patterns on opposite sides thereof, each code pattern made up of a plurality of code tracks. The two sensor disks are identical and are disposed on opposite sides of the code disk. Each sensor disk has one or more electrostatic sensing means for each code track, with all sensing means common to a single track coupled in parallel. Use of more than one sensing means for each track enhances the level of the signals representative of said each track.

Other objects and many of the attendant advantages of the present invention will become more readily apparent as reference is had to the following detailed disclosure when considered together with the accompanying drawings wherein.

Figures 1, 3, 5:
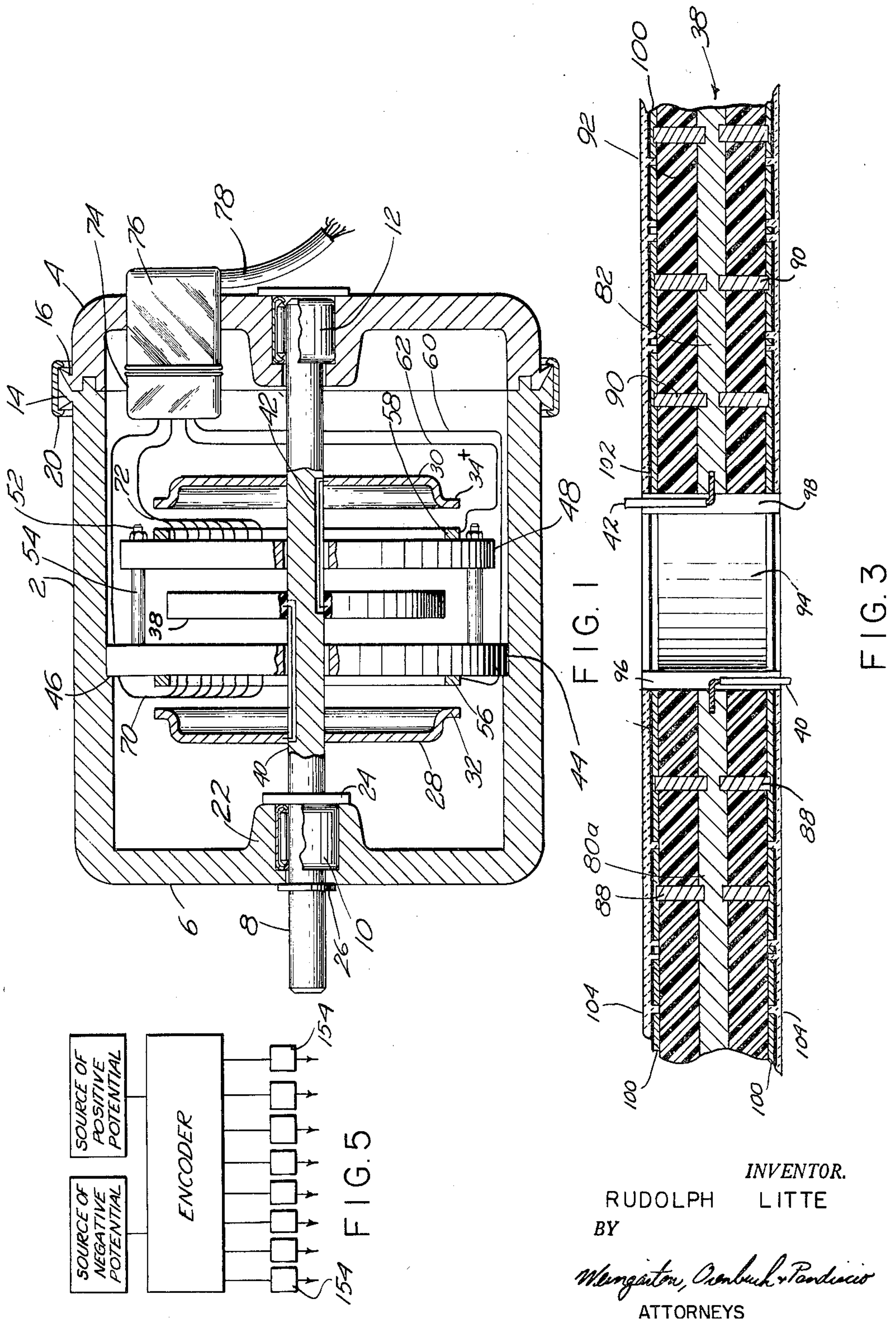
FIG. 1 is a longitudinal sectional view of a preferred form of analog-to-digital shaft encoder embodying the present invention.
FIG. 3 is a cross-sectional view of a portion of the code disk of FIG. 2.
FIG. 5 is a block diagram illustrating the input and output connections of the encoder of FIG. 1.

Referring now to FIG. 1, there is illustrated in simplified form an encoder employing capacitive coupling of input potentials to the code disk. The illustrated encoder comprises a housing 2 having a removable cover 4. Housing 2 has an end wall 6 provided with a central opening in which an input shaft 8 is rotatably supported by means of a needle bearing 10. The opposite end of the shaft is received in a needle bearing 12 which is supported in a central aperture formed in the cover 4. The adjacent ends of housing 2 and cover 4 are formed with mating flanges 14 and 16 respectively which are secured together by a split clamp ring 20 of conventional construction.

The needle bearing 10 is disposed in a collar 22 formed integral with end wall 6. Collar 22 cooperates with a flange 24 on shaft 8 to limit movement of the shaft away from the cover 4. A C-ring 26 snapped into an appropriate groove in the shaft acts against end wall 6 to prevent opposite movement of the shaft.

Shaft 8 carries two identical voltage coupling disks 28 and 30 formed of a conductive metal such as copper. These disks 28 and 30 are of dished construction, having offset flanges 32 and 34 respectively which are closer to each other than the main portions of the two disks. Also mounted on shaft 8 for rotation therewith is a code disk 38. The details of construction of this code disk are described more fully hereinafter. Electrically connecting coupling disk 28 and an internal core element (hereinafter described) of code disk 38 is an insulated wire lead 40. Wire lead 40 extends along shaft 8 in a groove therein. A second wire lead 42 connects coupling disk 30 and another internal core element (also hereinafter described) of disk 38. Lead 42 also extends along a groove formed in shaft 8.

Securely mounted within the housing 2 is an electrostatic sensor plate 44. In this connection it is to be observed that the interior of housing 2 is reduced in size to form a shoulder 46 which helps position plate 44. Sensor plate 44 is secured within the housing by suitable means, as, for example, by potting or by a friction fit. Supported by sensor plate 44 in spaced relation thereto is another electrostatic sensor plate 48. Sensor plate 48 is of smaller diameter than plate 44, whereby to leave an annular space between it and the inside surface of housing 2 to accommodate wire leads. Plate 48 is secured to plate 44 by means of suitable bolts 52 and standoff sleeves 54. Except for the fact that they have different outside diameters, the two sensor plates 44 and 48 are alike. Sensor plate 44 is made of insulating material and has an annular conductive metal ring 56 on one side thereof in facing relation with coupling disk 28. Sensor plate 48 has a corresponding ring of conductive metal 58 in facing relation to the second coupling disk 30. Connected to rings 56 and 58 are two wire leads 60 and 62 which function to couple opposite potentials to the rings. The potentials on rings 56 and 58 are capacitively coupled to wire leads 40 and 42 by voltage coupling disks 28 and 30 respectively. These leads in turn couple the opposite potentials to appropriate areas of the rotatable code disk 38. The two plates 56 and 58 have additional conductive segments (hereinafter described in detail) to which are attached additional wire leads collectively identified at 70 and 72 respectively. These wire leads 70 and 72, together with the leads 60 and 62, are connected to a male plug element 74 which snaps into a female receptacle 76 situated in cover 4. A cable 78 connects the female connector 76 with external circuitry to complete the system illustrated in FIG. 5.

Figures 2, 4:
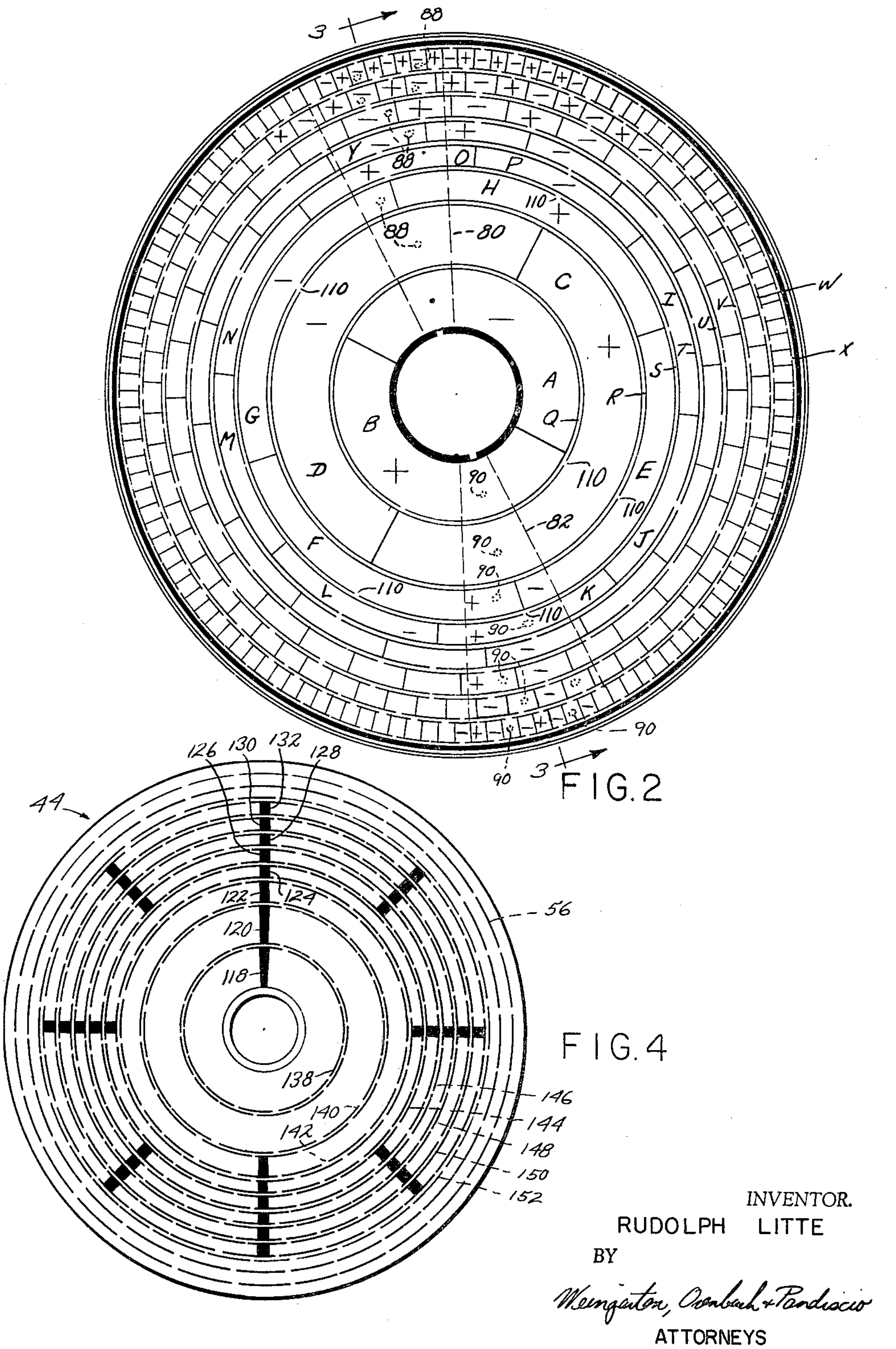
FIG. 2 is a negative illustration of the code pattern of the code disk embodied in the encoder of FIG. 1.
FIG. 4 is a positive illustration of the probe arrangement of the sensor disks embodied in the encoder of FIG. 1.

Turning now to FIGS. 2 and 3, the code disk 38 is of laminated construction. Its precise structure is best described by the method according to which it is manufactured. This method is relatively simple. First of all, two metal bars 80 and 82 are provided. Several holes are drilled in both sides of each bar. Into the holes of bar 80 are inserted conductive wires 88 which are soldered in place. Identical wires 90 are attached in the same manner to bar 82. Thereafter both bars are supported in a mold and a plastic disk is cast with the bars as internal core elements. The disk is formed of a strong insulating plastic 92 such as an epoxy resin. The plastic is provided with a center hole 94 which is just large enough to snugly accommodate shaft 8. The two bars 80 and 82 lie along a diameter of the disk. Two slots 96 and 98 are formed at opposite sides of hole 94 to expose the inner ends of bars 80 and 82 so that the leads 40 and 42 may be attached thereto as in FIG. 3. Thereafter both sides of plastic 92 are plated with copper films 100. Here it is to be observed that the wires 88 and 90 protrude slightly beyond the outer surfaces of the plastic. Hence, when the copper plating is applied, it covers and makes a secure contact with each of the wires 88 and 90. Both copper films 100 are then coated all over with a conventional photoresist material represented by the heavy line 102 in FIG. 3. This photoresist material is then exposed to a mater negative of the code wheel code pattern (FIG. 2). Thereafter the exposed photoresist material is developed by conventional chemicals. In the development process, the unexposed portions are removed, leaving bare copper. The bare copper is then etched away to leave on both sides of the disk a large number of copper segments arranged in a unique pattern. The photoresist material 102 which remains on the copper segments after the etching has has been completed may be removed. Preferably, however, it is left in place since its dielectric property helps increase the capacitance between the copper segments and the sensor disks 44 and 48. For the same purpose of increasing the capacitance, it is preferred to evaporate over both surfaces of the code disk a thin coating of glass 104.

Turning now to FIG. 2, this figure illustrates the code pattern of copper segments which is formed on the opposite sides of the code 38, but in negative form. Thus, in FIG. 2 the blank or white spots represent conductive copper segments and the dark lines and opaque portions represent the exposed, non-conductive plastic material 92.

The pattern illustrated in FIG. 2 is the one for an 8-track Gray code. Thus, the first or innermost track comprises two segments A and B, while the second track comprises two equal segments C and D displaced 90 degrees from segments A and B. The third track comprises four segments E, F, G, and H of equal arcuate length. The fourth track comprises eight equal segments I–P. The remaining tracks each have twice the number of segments than the track which immediately precedes it. Thus, the fifth track has sixteen segments, the sixth track has thirtytwo segments, the seventh track has sixty-four segments, and the eighth track has one hundred twenty-eight segments.

Between each pair of adjacent code tracks is a conductive bus ring. These rings are identified as Q, R, S, T, U V and W. An eighth conductive bus ring X runs around the outer track. The purpose of these copper bus rings is twofold: (1) to produce an arrangement wherein alternately occurring segments in each track are connected together in one polarized array and the remaining segments in the same code track are connected together in a second oppositely polarized array; and (2) to connect selected segments in adjacent tracks so as to facilitate application of identical electrical potentials to these segments.

As suggested hereinabove one varying potential is applied by conductor 40 to core bar 80 while a potential of opposite sign is applied by conductor 42 to core bar 82 of code wheel 38. The two core bars 80 and 82 are indicated in phantom in FIG. 2. The potentials on core bars 80 and 82 are coupled by the wires 88 and 90 to the copper segments which overlie them. In this case, one wire 88 makes contact with segment A, causing it, for example, to assume a negative potential as indicated by the minus sign. In the same fashion one wire 90 makes contact with segment B, causing it simultaneously to have a positive potential as indicated by the plus sign. Another wire 90 carried by bar 80 makes contact with segment C, causing it also to have a negative potential. Another wire 88 makes contact with segment D, causing it also to have a positive potential. Additional wires 88 and 90 simultaneously cause segments G and F of the third code track to have negative and positive potentials respectively.

However, none of the other segments of the third code track are contacted by a wire 88 or a wire 90. Moreover, only one segment K of the fourth code track is contacted by a wire, in this case, a wire 90. Nevertheless, both in the 4-segment third track and the 8-segment fourth track, successive segments are oppositely polarized. In the instant case this is accomplished by connecting selected segments to selected bus rings by means of conductive bridges 110. Thus, the negative segment G is connected by a bridge 110 to bus ring R, and the latter in turn is connected by an additional bridge 110 to segment E of the third track. As a result, segment E also is negative. The positive segment K of the fourth track is connected by another bridge 110 to bus ring S. The latter in turn is connected by an additional bridge 110 to segment H, thereby causing it also to be positive. The positive bus ring S also is connected by other bridges to segments I, M, and O of the fourth code track. The other segments J, L, N, and P of the fourth code track are made negative by still other bridges 110 which connect to negative bus ring T. The latter is made negative by virtue of a bridge connection to a segment Y of the fifth track which is contacted by a wire 88. The fifth, sixth, seventh, and eighth tracks are charged in the same manner. Bus ring U supplies a positive potential to segments of the fifth and sixth tracks, and bus ring W supplies a positive potential to segments of the seventh and eighth tracks. Bus ring V supplies a negative potential to the segments of the sixth and seventh tracks, and bus ring X supplies a negative potential to the eighth track. Bus rings U, V, W, and X are charged indirectly through segments and bridges in the manner described above.

Turning now to FIG. 4 there is presented a positive illustration of sensor plate 44. Since the sensor disk plate 48 is identical, it is to be understood that the following discussion applies with equal force to sensor plate 48.

On the side opposite the annular voltage coupling ring 56, sensor plate 44 is provided with a plurality of sensing probes 118, 120, 122, 124, 126, 128, 130, and 132. These probes are segments of copper plated on the sensor plate, the latter being formed of an insulating plastic such as an epoxy or polyester resin. The probes are located so as to be in registration with different code tracks on one side of code disk 38 when the sensor plate is mounted on shaft 8. Single probes 118 and 120 are provided for sensing the first and second code tracks; two probes 122 are provided to scan the third code track; and eight each of probes 124–132 are provided for sensing the fourth-to-eighth code tracks. These probes have different radial dimensions but substantially identical corresponding circumferential dimensions. The maximum width, i.e., circumferential dimension, of these probes is no greater than the width of the narrowest code segment on code wheel 38, in this case, the segments which make up the outermost or eighth code track. The probes for the fourth-to-eighth code tracks are uniformly spaced, and one each of these probes is in radial alignment with the probes for the first–third code tracks.

On the opposite side of sensor plate 44, eight narrow copper bus rings 138–152 are plated. These bus rings are disposed concentric to each other and also to voltage coupling ring 56. The eight wire leads 70 are connected to separate ones of the bus rings 138–152. The latter are connected to probes 118–132 respectively by leads (not shown) which are embedded in and pass through the sensor plate. In this connection, it is to be observed that these connecting leads may be introduced by drilling through the sensor plate, or the plate may be formed with the connecting leads in place. The manner in which the sensing probes and the concentric bus rings are applied to sensor plate 44 is not important to the present invention; it may be accomplished by any of the well-known conventional plating or printed circuit techniques.

The second sensor plate 48 is mounted so that its probes are in precise registration with the corresponding probes of sensor plate 44. The individual bus rings of sensor plate 48 are coupled by leads 72 in parallel with the corresponding bus rings of sensor plate 44.

Referring now to FIG. 5, to use the encoder of FIGS. 1–4, the leads 60 and 62 are connected via the cable 78 to separate potential sources which generate negative and positive potentials in pulse form for application to the code disk via leads 40 and 42. The pulse rate, i.e., the repetition frequency of the varying potentials, must exceed the product of the maximum number of segments in any one code track and the frequency of rotation of the operating shaft. The remaining leads in the cable 78 couple the sensing probes for the eight code tracks through the aforementioned harnesses 70 and 72 to separate amplifiers 154.

Operation of the encoder is straightforward. In considering any two immediately adjacent segments in any one track, the application of positive potential to one and of negative potential to the other will establish an electrostatic field between the two adjacent segments, much in the same manner as in a condenser except that here the two plates are side-by-side in the same plane. Since the field extends from a positive to a negative potential, there exists a point, ideally midway between the two segments, where the electrostatic field is zero.

Assuming that pulsating positive and negative potentials are applied to the code disk segments in the manner previously outlined, and that now the code disk is caused to rotate by operation of the shaft 8, each probe will detect the potential of the particular segment to which it is nearest. Thus, as successive code segments pass by each probe, the changes in polarity of the potentials detected by the probes will result in signals of opposite polarity which are applied to amplifiers 154. The signal outputs of the probes for the different code tracks taken in parallel will provide a binary indication of the angular position of the shaft.

It is to be noted that although in theory only one probe is required for each code track, in practice a single probe presents a problem in that the pulse signal level pickup is relatively low, especially with respect to the outer code tracks. However, by providing a code track with a circular array of small spaced probes and connecting them in parallel to function as one large probe, as described above in connection with FIG. 4, the output signal level for the code track is enhanced. In this connection, it is to be observed that the first, second, and third tracks and the probes therefor have substantially larger radial dimensions than the remaining codes, tracks, and probes. The reason for this is to standardize the impedances for each code channel so as to make it possible to use identical amplifiers 154.

The glass coating 104 on both sides of the code disk not only serves to increase the permissible voltage gradient between adjacent conductive segments by at least 4 to 1, but it also helps increase the capacitance between the code disk and the sensor disks. It also provides mechanical protection for the conductive code segments, a necessary requirement for long life since the code segments are delicate.

Obviously, the dimensions of the code disk and the sensor disks may be varied; however, it is preferred to respect certain important requirements. For one thing, the spacing between the code disk and each sensor disk is kept small. In practice, this spacing will be in the order of .003 to .005 inch. Preferably, also the thickness of the glass coating will be in the range of .001 to .003 inch and the spacing between adjacent code segments and also between code segments and bus rings will be in the order of .015 inch.

As indicated previously, it is not essential to have a dual code disk and two sensor disks; the invention will operate with only one sensor disk and a code disk having a single code pattern. The advantage of having two sensor plates instead of one is to compensate for wobble or tilt of the code disk. In the case of a single sensor disk, all of the probes will not have the same signal level if the code disk wobbles or is tilted. Having two sensor disks overcomes this disadvantage since if in a given code disk position a probe on one sensor disk is further away from the code disk than are other probes on the same sensor disk, the corresponding probe on the other sensor disk will be closer to the code disk than the other probes on the same sensor disk. Since the two sensor disks are coupled together, variations in the predetermined signal levels of one sensor disk due to wobble will be compensated by wobble-generated variations of opposite sign in the predetermined signal levels of the other sensor disk. It is to be observed that doubling the number of sensor disks doubles the capacitance, as a consequence of which the impedance is lowered by a factor of 2.

A great advantage of the encoder of FIGS. 1–4 is the manner in which the positive and negative potentials are connected to the code disk. In effect, the electrical relationship between the annular rings 56, 58 and disks 28, 30 may be described as a capacitive brush. The advantage of this arrangement is that there are no brushes or slip rings which can cause noise or wear away. Moreover, since the excitation voltage coupling disks 28, 30 are connected to low impedance sources, they effectively shield the code and sensor disks from stray external signals.

Although it is preferred to apply potentials in the form of positive and negative pulses to the code disk, it is contemplated also that the varying potentials may be in the form of two sinusoidal signals 180 degrees out of phase. In the latter case, since each code segment will be subjected to both negative and positive potentials, it is necessary to use a gating amplifier so as to sample the probe outputs on alternate half cycles. It is also contemplated that D.C. potentials may be applied to the code disk. However, in this case, the encoder will produce an output only when the shaft is rotating whereas with a varying potential the encoder will produce an output indicative of shaft position even when the code disk is stationary. An encoder utilizing a D.C. potential will work satisfactorily with A.C. coupled amplifiers provided the code wheel is rotated at a rapid rate. Such an encoder is useful as an incremental encoder.

Obviously, there are many possible variations of the present invention in addition to the variations mentioned above. An obvious one is an interchange of the sensor and code disks so that the sensor disks become rotors and the code disk becomes a stator. Other variations have to do with the type of code pattern provided on the code disk and the provision of other components within the encoder housing, as, for example, embodying amplifier modules within the housing. It is to be understood, therefore, that the invention is not limited in its application to the details of construction and arrangement of parts specifically described or illustrated, and that within the scope of the appended claim, it may be practiced otherwise than as specifically described or illustrated.

I claim:

An encoder comprising a housing, a shaft journaled for rotation on said housing, about an axis, a first sensor plate affixed to said housing about said axis, a second sensor plate affixed to said first sensor plate by spacers about said axis within said housing, said first sensor plate having a first series of sensing elements, said second sensor plate having a second series of sensing elements, a code disk affixed to said shaft for rotation about said axis between said first sensor plate and said second sensor plate, opposite faces of said code disk having distributions of conductive elements communicating capacitively with said first series of sensing elements and said second series of sensing elements, a first conductive annulus on said first sensor plate about said axis, a second conductive annulus on said second conducting plate about said axis, first conducting means for applying a first potential to said first conductive annulus, second conducting means for applying a first potential to said first conductive annulus, second conducting means for applying a second potential to said second conductive annulus, said first conductive annulus being at the face of said first sensor plate remote from said code disk, said second conductive annulus being at the face of said second sensor plate remote from said code disk, a first capacitor disk fixed to said shaft for rotation about said axis, said first capacitor disk having a rim adjacent to and registered with said first conductive annulus, a second capacitor disk fixed to said shaft for rotation about said axis, said second capacitor disk having a rim adjacent to and registered with said second conductive annulus, conducting means in said shaft for connecting said first capacitor disk electrically to certain conductive elements at one face of said code disk and certain elements at the other face of said code disk and conducting means in said shaft for connecting said second capacitor disk electrically to certain conductive elements at one face of said code disk and certain elements at the other face of said code disk.

References Cited by the Examiner

UNITED STATES PATENTS 2,873,440 2/59 Speller ---------------- 340—347

MALCOLM A. MORRISON, *Primary Examiner.*

IRVING L. SRAGOW, *Examiner.*